United States Patent
Wang

(10) Patent No.: US 10,963,637 B2
(45) Date of Patent: Mar. 30, 2021

(54) KEYWORD EXTRACTION METHOD, COMPUTER EQUIPMENT AND STORAGE MEDIUM

(71) Applicant: TENCENT TECHNOLOGY (SHENZHEN) COMPANY LTD, Shenzhen (CN)

(72) Inventor: Xu Xiang Wang, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 90 days.

(21) Appl. No.: 16/363,646

(22) Filed: Mar. 25, 2019

(65) Prior Publication Data
US 2019/0220514 A1 Jul. 18, 2019

Related U.S. Application Data

(63) Continuation of application No. PCT/CN2018/075711, filed on Feb. 8, 2018.

(30) Foreign Application Priority Data

Feb. 23, 2017 (CN) .......................... 201710101013.1

(51) Int. Cl.
*G06F 40/30* (2020.01)
*G06F 40/216* (2020.01)
(Continued)

(52) U.S. Cl.
CPC ............ *G06F 40/216* (2020.01); *G06F 17/18* (2013.01); *G06F 40/205* (2020.01);
(Continued)

(58) Field of Classification Search
CPC ...... G06F 40/30; G06F 40/40; G06F 16/2452; G10L 15/16; G10L 15/18
See application file for complete search history.

(56) References Cited

U.S. PATENT DOCUMENTS

2005/0086224 A1* 4/2005 Franciosa ........... G06F 16/3334
2006/0287988 A1* 12/2006 Mason ................... G06Q 30/02
(Continued)

FOREIGN PATENT DOCUMENTS

| CN | 101122909 A | 2/2008 |
|---|---|---|
| CN | 101944099 A | 1/2011 |

(Continued)

OTHER PUBLICATIONS

Shindo et al., "The analysis of double word expression which used one person and a convolution neural network in outside", Information Processing Society of Japan Report of research Natural language processing (NL), vol. 2015-NL-223, No. 3, Japan, Information Processing Society of Japan, Sep. 20, 2015, p. 1-7 (7 pages total).

(Continued)

*Primary Examiner* — Daniel Abebe
(74) *Attorney, Agent, or Firm* — Sughrue Mion, PLLC

(57) ABSTRACT

A keyword extraction method is provided. The keyword extraction method is performed by at least one processor and includes: obtaining to-be-determined words of to-be-processed text; determining preceding words respectively corresponding to the to-be-determined words, where the preceding words are words appearing in the to-be-processed text and preceding the to-be-determined words; determining word sequences of the to-be-determined words according to orders in which the to-be-determined words and the preceding words respectively corresponding to the to-be-determined words appear in the to-be-processed text; inputting the word sequences of the to-be-determined words respectively into a trained cyclic neural network model; obtaining, from the trained cyclic neural network model, a probability that each of the to-be-determined words is a key word of the to-be-processed text; and determining keywords of the to-
(Continued)

be-processed text according to the probability that each of the to-be-determined words is a keyword of the to-be-processed text and a preset threshold.

20 Claims, 5 Drawing Sheets

(51) Int. Cl.
    *G06F 17/18*     (2006.01)
    *G06N 20/00*     (2019.01)
    *G06N 3/08*     (2006.01)
    *G06F 40/205*     (2020.01)
    *G06F 40/284*     (2020.01)

(52) U.S. Cl.
    CPC ............ *G06F 40/284* (2020.01); *G06N 3/08* (2013.01); *G06N 20/00* (2019.01)

(56) References Cited

U.S. PATENT DOCUMENTS

| | | | |
|---|---|---|---|
| 2010/0145678 A1 | 6/2010 | Csomai et al. | |
| 2011/0313865 A1 | 12/2011 | Sinyagin et al. | |
| 2015/0127594 A1* | 5/2015 | Parada San Martin | G06N 3/0454 706/16 |
| 2017/0046345 A1* | 2/2017 | Takahashi | G06F 16/24578 |
| 2018/0108354 A1* | 4/2018 | Negi | G10L 15/26 |
| 2018/0189269 A1* | 7/2018 | Quirk | G06F 40/289 |
| 2020/0250376 A1* | 8/2020 | Guo | G06F 16/345 |

FOREIGN PATENT DOCUMENTS

| | | |
|---|---|---|
| CN | 105139237 A | 12/2015 |
| CN | 106095749 A | 11/2016 |
| JP | 2004-348637 A | 12/2004 |
| JP | 2015-132899 A | 7/2015 |
| JP | 2016-134169 A | 7/2016 |

OTHER PUBLICATIONS

Yoshioka et al., "The proposal of the multi-attention model for one person and a generated type one-sentence summary", DEIM Forum 2016 E8-3, The forum (the 14th Japan database society annual meeting) concerning the 8th data engineering and information management, Japan, the Institute of Electronics, Information and Communication Engineers data engineering research special committee, Aug. 8, 2016, p. 1-7 (7 pages total).
Communication dated Jul. 6, 2020, from the Japanese Patent Office in Application No. 2019-521096.
Written Opinion dated May 8, 2018, from the International Searching Authority in International Application No. PCT/CN2018/075711.
International Search Report for PCT/CN2018/075711 dated May 8, 2018 [PCT/ISA/210].
Wang, Xuxiang, "Research on Question Keywords Extraction Techniques for Question Answering", China Master's Theses Full-text Database, Electronic Technology & Information Science, No. 2, 2017, 1138-4735, pp. 9 and 34-38 (11 pages total).
Communication dated Dec. 2, 2020, from The China National Intellectual Property Administration in Application No. 201710101013.1.

\* cited by examiner

KEYWORD EXTRACTION METHOD, COMPUTER EQUIPMENT AND STORAGE MEDIUM

CROSS-REFERENCE TO RELATED APPLICATIONS

This application is a continuation of International Patent Application No. PCT/CN2018/075711, which claims priority from Chinese Patent Application No. 201710101013.1, entitled "KEYWORD EXTRACTION METHOD AND APPARATUS" and filed with the Chinese Patent Office on Feb. 23, 2017, the disclosures of which are incorporated herein by reference in their entireties.

BACKGROUND

Field

Methods and apparatuses relate to information technologies, and in particular, to a keyword extraction method, a computer device, and a storage medium.

Description of Related Art

Information expression has diversified with developments in the information age. With recent network developments, the amount of online text information has explosively increased. Obtaining required text information manually is more and more difficult. Therefore, efficiently obtaining information has become an important topic.

To efficiently process massive amounts of text data, researchers have studied text categorization, text clustering, automatic summarization, information retrieval, and the like. The studies all relate to a key and basic problem, that is, how to extract keywords from text.

A conventional keyword extraction method uses a machine learning algorithm based on feature selection and efficient features need to be extracted manually according to features of data. Because a manual working manner depends on subjective thought to a large extent, accuracy of keywords cannot be ensured.

SUMMARY

One or more embodiments provide a keyword extraction method, a computer device, and a storage medium.

According to an aspect of an embodiment, there is provided a keyword extraction method, performed by at least one processor, that includes: obtaining, by the at least one processor, to-be-determined words of to-be-processed text; determining, by the at least one processor, preceding words respectively corresponding to the to-be-determined words, the preceding words being words appearing in the to-be-processed text and preceding the to-be-determined words; determining, by the at least one processor, word sequences of the to-be-determined words according to orders in which the to-be-determined words and the preceding words respectively corresponding to the to-be-determined words appear in the to-be-processed text; inputting, by the at least one processor, the word sequences of the to-be-determined words respectively into a trained cyclic neural network model; obtaining, by the at least one processor, from the trained cyclic neural network model, a probability that each of the to-be-determined words is a keyword of the to-be-processed text; and determining, by the at least one processor, keywords of the to-be-processed text according to the probability that each of the to-be-determined words is a keyword of the to-be-processed text and a preset threshold.

According to an aspect of an embodiment, there is provided a computer device, including at least one memory configured to store computer program code; at least one processor configured to access the at least one memory and operate as instructed by the computer program code, the computer program code including: obtaining code configured to cause the at least one processor to obtain to-be-determined words of to-be-processed text; determining code configured to cause the at least one processor to determine preceding words respectively corresponding to the to-be-determined words, the preceding words being words appearing in the to-be-processed text and preceding the to-be-determined words; determining word sequences code configured to cause the at least one processor to determine word sequences of the to-be-determined words according to orders in which the to-be-determined words and the preceding words respectively corresponding to the to-be-determined words appear in the to-be-processed text; inputting code configured to cause the at least one processor to input the word sequences of the to-be-determined words respectively into a trained cyclic neural network model; probability obtaining code configured to cause the at least one processor to obtain, from the trained cyclic neural network model, a probability that each of the to-be-determined words is a key word of the to-be-processed text; and determining keywords code configured to cause the at least one processor to determine keywords of the to-be-processed text according to the probability that each of the to-be-determined words is a keyword of the to-be-processed text and a preset threshold.

According to an aspect of an embodiment, there is provided one or more non-transitory storage mediums storing computer readable instructions, the computer readable instructions, when executed by one or more processors, causing the one or more processors to: obtain to-be-determined words of to-be-processed text; determine preceding words respectively corresponding to the to-be-determined words, the preceding words being words appearing in the to-be-processed text and preceding the to-be-determined words; determine word sequences of the to-be-determined words according to orders in which the to-be-determined words and the preceding words respectively corresponding to the to-be-determined words appear in the to-be-processed text; input the word sequences of the to-be-determined words respectively into a trained cyclic neural network model; obtain, from the trained cyclic neural network model, a probability that each of the to-be-determined words is a key word of the to-be-processed text; and determine keywords of the to-be-processed text according to the probability that each of the to-be-determined words is a keyword of the to-be-processed text and a preset threshold.

BRIEF DESCRIPTION OF THE DRAWINGS

The above and other aspects, features and advantages will become apparent from the following detailed description taken in conjunction with the accompanying drawings in which.

DETAILED DESCRIPTION

To make the objectives, technical solutions, and advantages of this application be more clear and comprehensible, embodiments will be further described in detail with reference to the accompany drawings. It should be understood that, the specific implementations described herein are only used for interpreting this application, rather than limiting this application.

Figure 1:
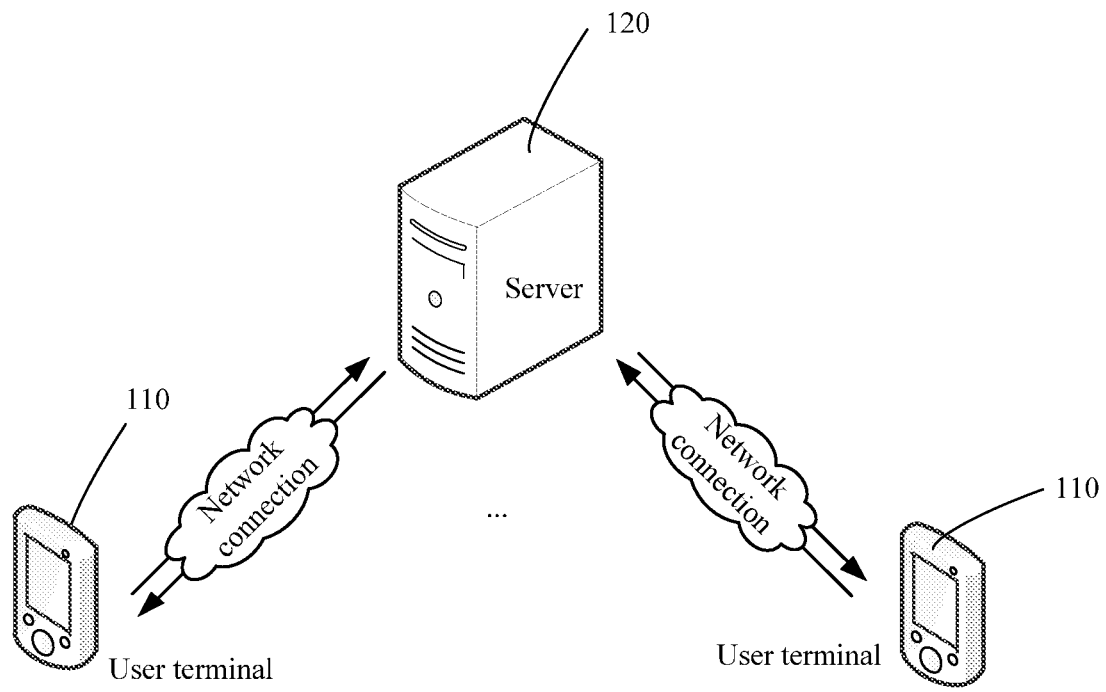
FIG. 1 is a schematic diagram of an application environment of a keyword extraction method according to an embodiment.

FIG. 1 is a schematic diagram of an application environment of a keyword extraction method according to an embodiment. As shown in FIG. 1, the application environment includes user terminals 110 and a server 120, and the user terminals 110 are in communication with the server 120. The user terminal 110 includes, or is configured to interact with, a search engine or a question answering system. A user enters text through one of the user terminals 110, the entered text is sent to the server 120 through a communications network, the server 120 processes the entered text, extracts a keyword in the entered text, and provides search results or question answering results for the user. Alternatively, the user enters text through one of the user terminals 110, the user terminal 110 processes the entered text, extracts a keyword of the entered text, and sends the keyword to the server 120 through a communications network, and the server 120 provides search results or question answering results for the user.

Figure 2:
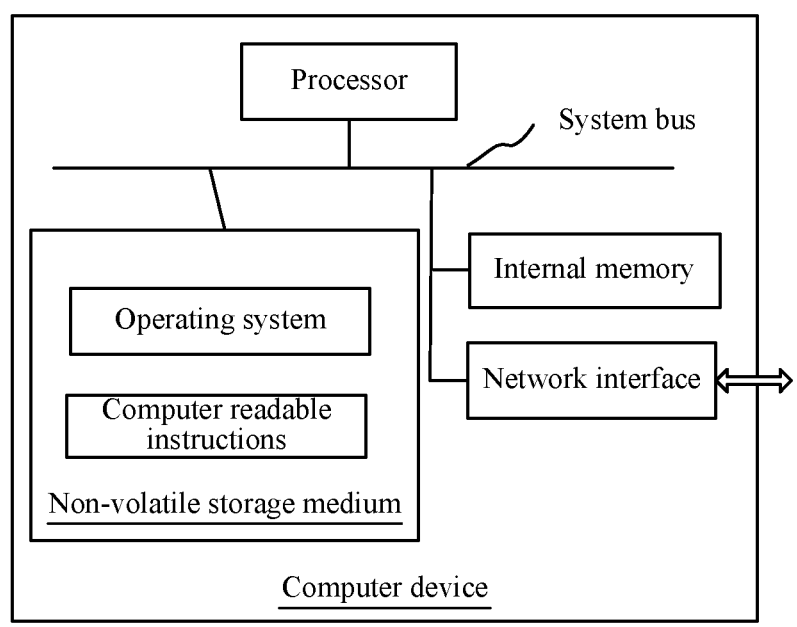
FIG. 2 is a schematic diagram of an internal structure of a computer device according to an embodiment.

FIG. 2 is a schematic diagram of an internal structure of a computer device according to an embodiment. The computer device may be a user terminal or a server. As shown in FIG. 2, the computer device includes a processor, a memory, and a network interface that are connected through a system bus. The processor is configured to provide computation and control ability, to support operation of the computer device. The memory includes a non-volatile storage medium and an internal memory. The non-volatile storage medium may store an operating system and computer readable instructions, and the internal memory provides an environment for running the operating system and the computer readable instructions in the non-volatile storage medium. When the computer readable instructions are executed by the processor, the processor may perform a keyword extraction method. The network interface is configured to perform network communication with an external terminal.

Embodiments are not limited to the structure shown in FIG. 2, and various changes may be made without departing from the scope of the present disclosure. Specifically, the computer device may include more or less members than those in FIG. 2, or include a combination of two or more members, or include different member layouts.

Figure 3:
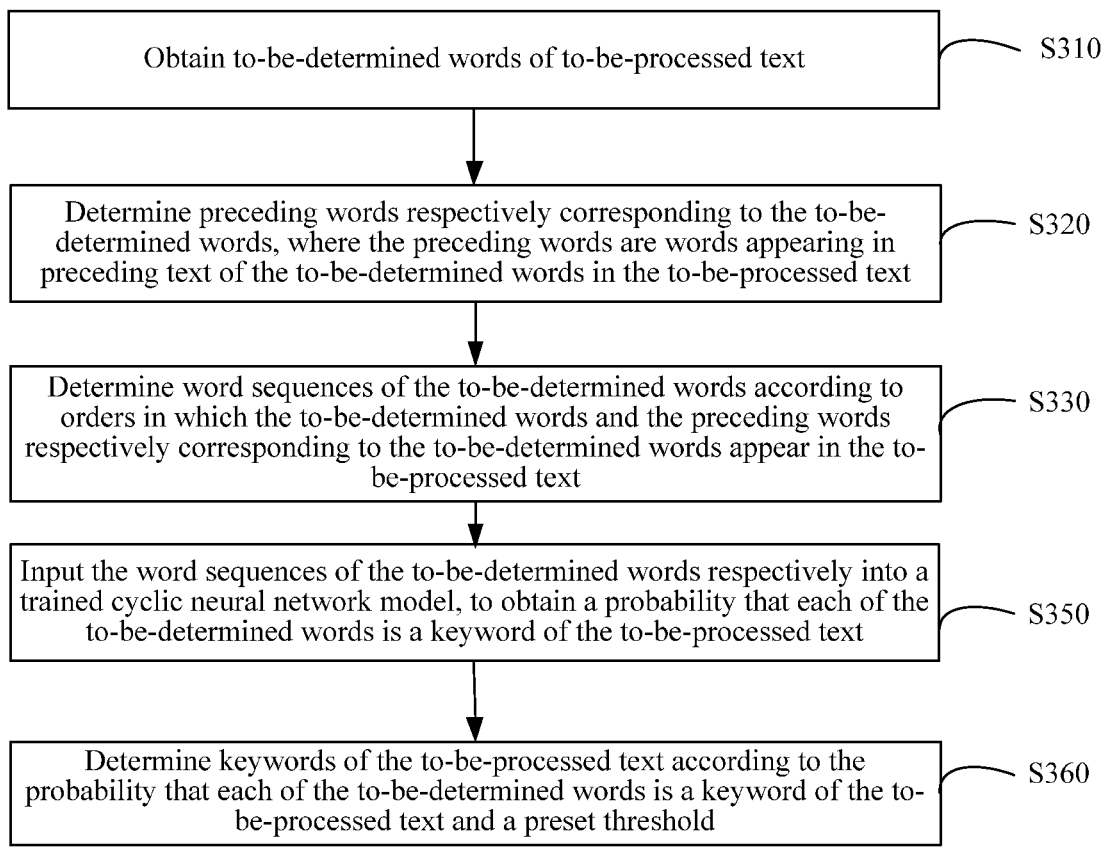
FIG. 3 is a flowchart of a keyword extraction method according to an embodiment.

Referring to FIG. 3, in an embodiment, a keyword extraction method is provided. The keyword extraction method is run in the server 120 shown in FIG. 1 based on text received from a user terminal 110. The keyword extraction method includes the following steps:

S310: Obtain to-be-determined words of to-be-processed text.

The to-be-processed text usually consists of individual characters. Compared with an individual character, a word can express meaning better and have more practical meaning.

The to-be-processed text may be preprocessed, to obtain to-be-determined words of the to-be-processed text. The to-be-determined words are words in the to-be-processed text, and whether the words are keywords of the to-be-processed text may be determined. The to-be-determined words may be words of the to-be-processed text that are identified after word segmentation is performed. That is, preprocessing may include word segmentation. To improve processing efficiency, the to-be-determined words may be words that are extracted from words of the to-be-processed text and have practical meaning. That is, preprocessing may further include processing of identifying stop words and excluding the stop words.

In an implementation, before step 310, the method further includes a step of obtaining the to-be-processed text. A user enters text through a user terminal, the user terminal transmits the text through a communication network, and a server obtains the text entered by the user from the user terminal through a communications network, to obtain the to-be-processed text.

S320: Determine preceding words respectively corresponding to the to-be-determined words, where the preceding words are words appearing in preceding text of the to-be-determined words in the to-be-processed text.

Preceding words are words appearing in the preceding text of the to-be-determined words in the to-be-processed text. The preceding words respectively corresponding to the to-be-determined words may be determined according to the to-be-processed text. Specifically, the preceding words appearing in preceding text of each of the to-be-determined words may be determined according to an order of words appearing in the to-be-processed text, where the words are obtained after preprocessing (for example, word segmentation) is performed on the to-be-processed text.

S330: Determine word sequences of the to-be-determined words according to orders in which the to-be-determined words and the preceding words respectively corresponding to the to-be-determined words appear in the to-be-processed text.

It should be noted that, a first to-be-determined word in the to-be-processed text may not have a corresponding preceding word, and a word sequence of the first to-be-determined word may consist of the first to-be-determined word itself.

The other to-be-determined words, other than the first to-be-determined word, have preceding words, and a corresponding word sequence of a to-be-determined word is a word sequence that is of preceding words of the to-be-determined word and the to-be-determined word itself and that is determined in order in which the words (the preceding words and the to-be-determined word) appear in the to-be-processed text.

S350: Input the word sequences of the to-be-determined words respectively into a trained cyclic neural network model, to obtain a probability that each of the to-be-determined words is a key word of the to-be-processed text.

The cyclic neural network model in this embodiment may be a Recurrent Neural Net (RNN) mode, a Long Short-Term Memory (LSTM) model, or a Gated Recurrent Unit (GRU) model. The cyclic neural network model includes an input layer, a hidden layer, and an output layer. A hidden unit in the hidden layer finishes the most important operation, that is, obtaining a probability that each of the to-be-determined words is a keyword of the to-be-processed text according to the input word sequences of the to-be-determined words. The word sequences input into the trained cyclic neural network model are determined according to the to-be-determined words and the preceding words of the to-be-determined words. Therefore, the information of the preceding text may be fully considered to obtain a more accurate probability that each of the to-be-determined words is a keyword of the to-be-processed text.

S360: Determine keywords of the to-be-processed text according to the probability that each of the to-be-determined words is a keyword of the to-be-processed text and a preset threshold.

A probability that each of the to-be-determined words in the to-be-processed text is a keyword is compared with the preset threshold respectively, and to-be-determined words whose probabilities are greater than or equal to the preset threshold are determined as keywords of the to-be-processed text.

Setting of the threshold is associated with specific demand A higher threshold indicates higher accuracy and a lower recall rate. A lower threshold indicates lower accuracy and a higher recall rate. According to various embodiments, a user may set the threshold according to demand For example, the threshold may be set to 0.5.

In an implementation, after step 360, the method further includes a step of transmitting the determined keywords. The server transmits the determined keywords through a communication network, and a user equipment obtains the determined keywords determined by the server from the server through a communications network.

For the foregoing keyword extraction method, it is unnecessary to extract efficient features manually according to data characteristics, but a word sequence is input into a trained cyclic neural network model to obtain a probability that a corresponding to-be-determined word is a keyword. Furthermore, the word sequence input into the trained cyclic neural network model is determined by the to-be-determined word and a preceding word of the to-be-determined word. Therefore, information of a preceding part may be fully considered to obtain a more accurate probability that the to-be-determined word is a keyword of the to-be-processed text, thereby enhancing accuracy of the extracted keyword.

In an embodiment, the step of obtaining to-be-determined words of to-be-processed text, that is, step S310, includes the following steps:

Step a: Perform word segmentation on the to-be-processed text, to obtain words in the to-be-processed text; and Step b: Identify stop words in the to-be-processed text and determine words other than the stop words in the to-be-processed text as the to-be-determined words.

Stop words in the to-be-processed text may be identified by comparing words in a stop word library with the words in the to-be-processed text. For example, common stop words include "of," "-ed", "what", and the like, and cannot be keywords. In this embodiment, the words other than the stop words in the to-be-processed text are determined as the to-be-determined words. The words other than the stop words are usually notional words. The notional words, rather than the stop words, are used as the to-be-determined words, thereby not only preventing accuracy of keyword extraction from being affected by output results of the stop words, but also enhancing a speed of extracting keywords.

In an embodiment, the preceding words include words, other than the stop words, appearing in the preceding text of the to-be-determined words in the to-be-processed text. It may be understood that, the words, other than the stop words, appearing in the preceding text of the to-be-determined words in the to-be-processed text are the notional words appearing in the preceding text of the to-be-determined words in the to-be-processed text.

In another embodiment, the preceding words include all words appearing in the preceding text of the to-be-determined words in the to-be-processed text, that is, include the stop words and the notional words appearing in the preceding text of the to-be-determined words in the to-be-processed text.

In an embodiment, step S330 may include:

Step a: Obtain word vectors of the preceding words respectively corresponding to the to-be-determined words and word vectors of the to-be-determined words; and Step b: Determine, according to the orders in which the preceding words respectively corresponding to the to-be-determined words and the to-be-determined words appear in the to-be-processed text, word sequences of the to-be-determined words by using the word vectors of the preceding words respectively corresponding to the to-be-determined words and the word vectors of the to-be-determined words, the word sequences being word vector sequences.

A word vector is vector representation corresponding to a word, is a manner for digitizing words in a natural language, and may be obtained by training a language model. A common language model is Word2vec that uses deep leaning to simplify text content processing as vector operation in a K-dimensional vector space by means of training. In a specific implementation, Word2vec is used to perform training on large-scale text data to obtain word vectors of each word, and the word vectors of each word in the to-be-processed text are obtained by means of searching, thereby obtaining the word vectors of the preceding words corresponding to the to-be-determined words and the word vectors of the to-be-determined words.

In this way, the word vectors are used to represent each word, and therefore, word-level semantic information may be improved, to further enhance the accuracy of the extracted keyword.

It should be noted that, when a word sequence input into the trained cyclic neural network model is a word vector sequence, a result output by the hidden layer of the trained cyclic neural network model is also a vector, and to map the vector in a range of 0 to 1 to represent a probability of each of the to-be-determined words, a Softmax function or a Sigmoid function may be used. The Softmax function is a common multi-class regression model. Determining whether a to-be-determined word is a keyword causes a two-dimensional problem. The corresponding Softmax function has two dimensions, one dimension represents a probability that the to-be-determined word is a keyword, and the other dimension represents a probability that the to-be-determined word is not a keyword.

Furthermore, the word vectors respectively corresponding to the preceding words and the to-be-determined words are obtained by training a corpus in a large scale. A word vector obtained by training the corpus in a large scale can make full use of semantic information of a word to determine a keyword at a semantic level, to further enhance the accuracy of the extracted keyword.

Figure 4:
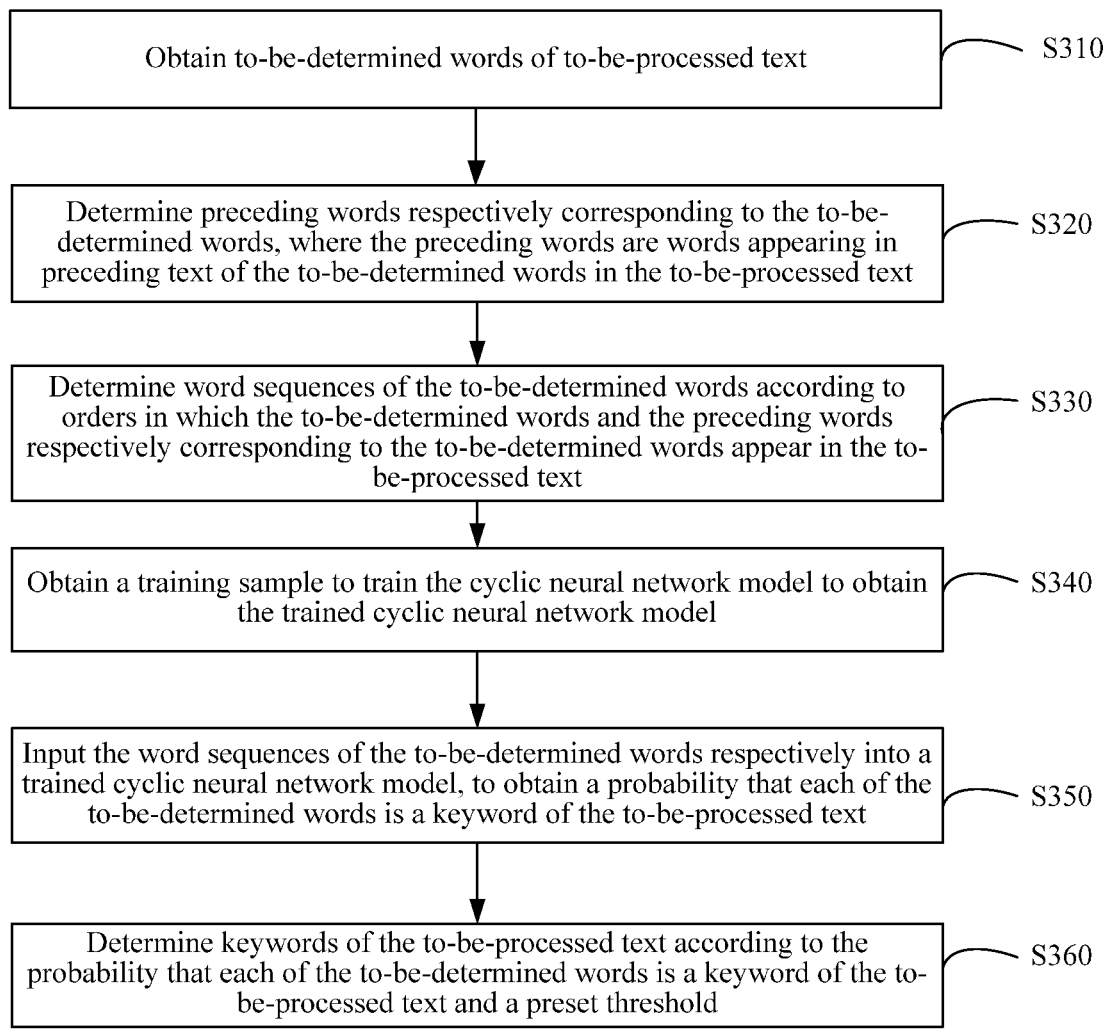
FIG. 4 is a flowchart of a keyword extraction method according to another embodiment.

Referring to FIG. 4, in an embodiment, to further enhance the accuracy of the extracted keyword, before the inputting the word sequences of the to-be-determined words respectively into a trained cyclic neural network model, the method further includes steps of:

S340: Obtain a training sample to train the cyclic neural network model to obtain the trained cyclic neural network model, where the training sample includes an element pair and the element pair includes a training word corresponding to training text and a probability that the training word is a keyword of the training text.

A value of a probability that the training word in the element pair is a keyword of the training text is 0 or 1. When the value is 0, it represents that the training word is not a keyword of the training text, and when the value is 1, it represents that the training word is a keyword of the training text.

During a training process, Gaussion distribution may be used to initialize network parameters of the cyclic neural network model, a word sequence may be formed for the $i^{th}$ to-be-determined word of the training text and each of preceding words of the $i^{th}$ to-be-determined word according to an order of these words appearing in the to-be-processed text, and each of the word vectors in the word sequence may be sequentially input into the cyclic neural network model, to obtain a loss of the $i^{th}$ to-be-determined word, thereby obtaining losses of each of the to-be-determined words. It should be noted that, during a training process, a gradient descent method is used to update parameters of the cyclic neural network model.

In an embodiment, the cyclic neural network model is an LSTM model.

Figure 5:
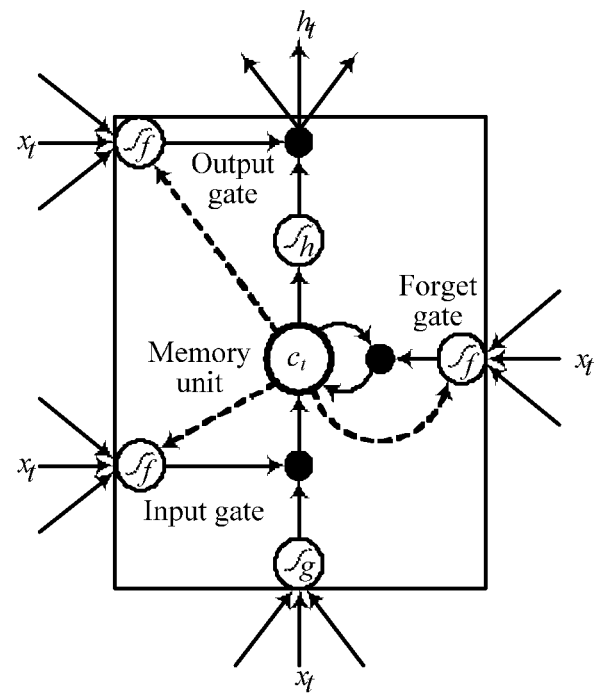
FIG. 5 is a structural diagram of a Long Short-Term Memory (LSTM) unit according to an embodiment.

The LSTM model is based on an RNN model. The hidden unit in the cyclic neural network mode is an LSTM unit. A structural diagram of an LSTM unit is shown in FIG. 5. A memory unit is used for storing historical information, and update and usage of the historical information are respectively controlled by three gates, that is, an input gate, a forget gate, and an output gate. The LSTM model can overcome defects about inputting a variable-length sequence and thereby store improved historical information. Therefore, the accuracy of the extracted keyword is enhanced.

Figure 6:
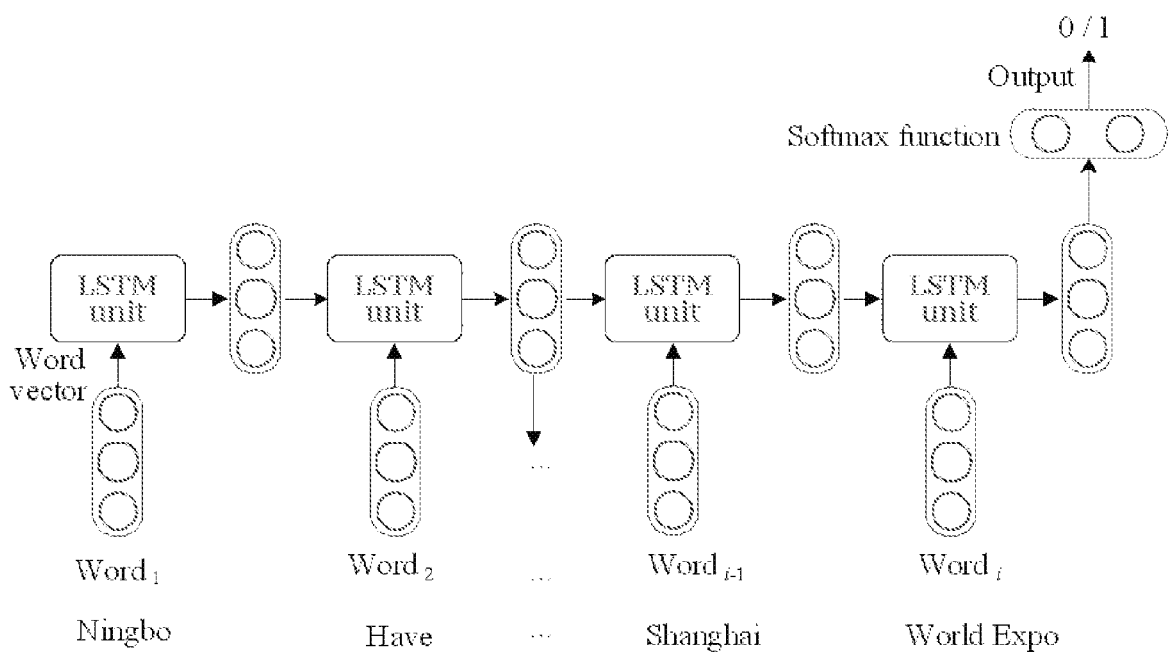
FIG. 6 is a schematic structural diagram of a model corresponding to a keyword extraction method according to an embodiment.

With reference to FIG. 5 and FIG. 6, for example, the cyclic neural network model is used as the LSTM model to process a word sequence of a to-be-determined word, word vectors (for example, word embedding) of each of preceding words in a word sequence corresponding to the to-be-determined word and word vectors of the to-be-determined word are input into the trained LSTM model according to an order of the words appearing in the to-be-processed text. Therefore, the LSTM model is used repeatedly according to a quantity of the to-be-determined words, to obtain a probability that each of the to-be-determined words is a keyword of the to-be-processed text. Furthermore, each of the to-be-determined words is used as an input of the last LSTM unit of the LSTM model, and historical information of a preceding part of each of the to-be-determined words, that is, semantic information of each of preceding words corresponding to each of the to-be-determined words, is considered before an output result of each of the to-be-determined words is output. Results of each of the to-be-determined words output by the LSTM model are outputs of the last hidden layer (LSTM unit) of the LSTM model.

The keyword extraction method of the present disclosure is further described below with reference to a specific embodiment.

Referring to FIG. 6, a model corresponding to the keyword extraction method includes an LSTM unit and a Softmax function. A classifier may be constructed by using the model, and determine, for each of to-be-determined words of to-be-processed text, a probability that each of the to-be-determined words is a keyword. For a to-be-determined word, all words are extracted from the beginning of a sentence to form a word sequence. Inputs of the model are word vectors, each LSTM unit can output a word result corresponding to a word vector input for the LSTM unit, and the word result and a next word vector in the word sequence are used as an input of a next LSTM unit. The last LSTM unit uses an output result of a previous LSTM unit and the word vectors of the to-be-determined word as an input of the last LSTM unit, and an output result is a result corresponding to the to-be-determined word represented in a form of a vector. A probability that the to-be-determined word is a keyword is determined based on the result in a form of a vector by using the Softmax function. The probability that the to-be-determined word is a keyword is compared with a preset threshold to determine whether the to-be-determined word is a keyword.

For example, the to-be-processed text is "what special product does Ningbo have for presentation in Shanghai World Expo". After word segmentation, the determined to-be-determined words include "Ningbo", "special product", "Shanghai", "World Expo", "for", and "presentation". Word vectors of each of the to-be-determined words and word vectors of each of preceding words of a preceding part of each of the to-be-determined words are input into a trained cyclic neural network model in an order that the words appear in the to-be-processed text, to obtain a probability that each of the to-be-determined words is a keyword of the to-be-processed text. For example, when the to-be-determined word is "World Expo", as shown in FIG. 6, corresponding word vectors are input into the cyclic neural network model in an order of "Ningbo", "have", "special product", "Shanghai", and "World Expo". The word vector of "Ningbo" is input into a first LSTM unit of the LSTM model, the word vector of "have" is input into a second LSTM unit, and so on, and the word vector of the to-be-determined word "World Expo" is input into a last LSTM unit, and each LSTM unit is influenced by an output of a previous LSTM unit. An output of the LSTM model is a probability value corresponding to an output vector of the last LSTM unit that is mapped by the Softmax function, to obtain a probability that each of the to-be-determined words is a keyword of the to-be-processed text. The input word vector sequence includes vectors of each of the preceding words corresponding to the to-be-determined word and the word vector of the to-be-determined word, to consider information of a preceding part, and historical information may be stored in the LSTM model better. Therefore, a more accurate probability that the to-be-determined word is a keyword of the to-be-processed text may be obtained.

It should be understood that, although each step of the flowcharts in FIG. 3 and FIG. 4 is displayed sequentially according to arrows, embodiments are not limited to the illustrated order of steps as indicated by the arrows. Unless indicated clearly, the steps do not need to be performed in a strict order, and can be performed in another sequence. Furthermore, at least some steps in FIG. 3 and FIG. 4 may include a plurality of sub-steps or a plurality of stages. The sub-steps or stages are not necessarily performed at the same moment, and may be performed at different moments. The sub-steps or stages are not necessarily performed in order, and may be performed in turn or alternately with other steps or at least some of sub-steps or stages of other steps.

In an embodiment, a computer device is further provided. An internal structure of the computer device is shown in FIG. 2. The computer device includes a keyword extraction apparatus. As discussed below, the keyword extraction apparatus includes various modules and units, and each module and unit may be all or partially implemented by software, hardware, or a combination thereof.

Figure 7:
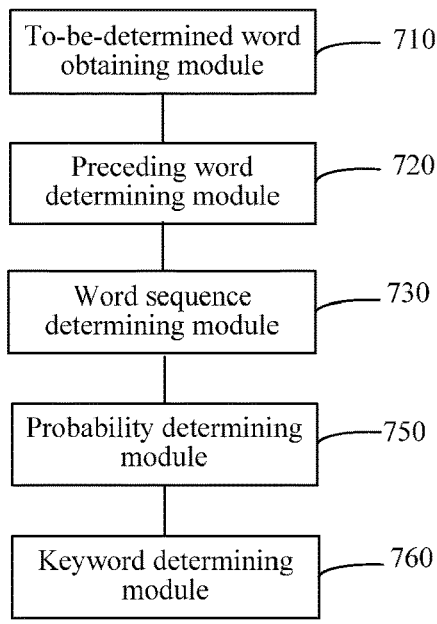
FIG. 7 is a structural block diagram of a computer device according to an embodiment.

In an embodiment, a keyword extraction apparatus is provided, and as shown in FIG. 7, includes a to-be-determined word obtaining module 710, a preceding word determining module 720, a word sequence determining module 730, a probability determining module 750, and a keyword determining module 760.

The to-be-determined word obtaining module 710 is configured to obtain to-be-determined words of to-be-processed text.

The preceding word determining module 720 is configured to determine preceding words respectively corresponding to the to-be-determined words, the preceding words being words appearing in preceding text of the to-be-determined words in the to-be-processed text.

The word sequence determining module 730 is configured to determine word sequences according to orders in which the to-be-determined words and the preceding words respectively corresponding to the to-be-determined words appear in the to-be-processed text.

The probability determining module 750 is configured to input the word sequences of the to-be-determined words respectively into a trained cyclic neural network model, to obtain a probability that each of the to-be-determined words is a key word of the to-be-processed text.

The keyword determining module 760 is configured to determine keywords of the to-be-processed text according to the probability that each of the to-be-determined words is a keyword of the to-be-processed text and a preset threshold.

For the foregoing keyword extraction apparatus, it is unnecessary to extract efficient features manually according to data characteristics. Rather, a word sequence is input to the trained cyclic neural network model to obtain a probability that a corresponding to-be-determined word is a keyword. Furthermore, the word sequence input to the trained cyclic neural network model includes the to-be-determined word and a preceding word of the to-be-determined word. Therefore, information of a preceding part may be fully considered to obtain a more accurate probability that the to-be-determined word is a keyword of the to-be-processed text, thereby enhancing accuracy of the extracted keyword.

Figure 8:
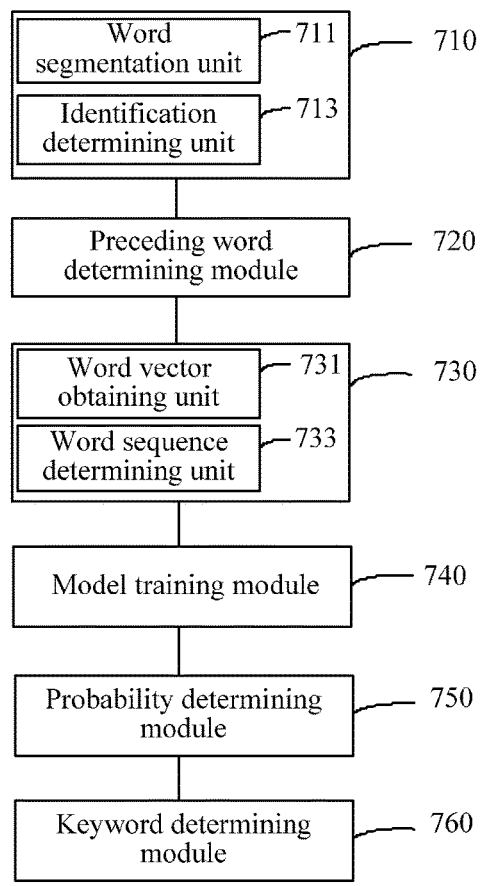
FIG. 8 is a structural block diagram of a computer device according to another embodiment.

Referring to FIG. 8, in an embodiment, the to-be-determined word obtaining module 710 includes a word segmentation unit 711 and an identification determining unit 713.

The word segmentation unit 711 is configured to perform word segmentation on the to-be-processed text, to obtain words in the to-be-processed text.

The identification determining unit 713 is configured to identify stop words in the to-be-processed text and determine words other than the stop words in the to-be-processed text as the to-be-determined words.

In an embodiment, the preceding words include words, other than the stop words, appearing in the preceding text of the to-be-determined words in the to-be-processed text.

In an embodiment, the word sequence determining module 730 includes a word vector obtaining unit 731 and a word sequence determining unit 733.

The word vector obtaining unit 731 is configured to obtain word vectors of the preceding words respectively corresponding to the to-be-determined words and word vectors of the to-be-determined words.

The word sequence determining unit 733 is configured to determine, according to the orders in which the preceding words respectively corresponding to the to-be-determined words and the to-be-determined words appear in the to-be-processed text, word sequences of the to-be-determined words by using the word vectors of the preceding words respectively corresponding to the to-be-determined words and the word vectors of the to-be-determined words, the word sequences being word vector sequences.

Referring to FIG. 8, in an embodiment, the keyword extraction apparatus further includes:

a model training module 740, configured to obtain a training sample to train the cyclic neural network model to obtain the trained cyclic neural network model, and the training sample includes an element pair and the element pair includes a training word corresponding to training text and a probability that the training word is a keyword of the training text.

In an embodiment, the cyclic neural network model is an LSTM model.

The keyword extraction apparatus corresponds to the keyword extraction method, and the specific technical features in the apparatus that correspond to the method are not repeated herein.

A person of ordinary skill in the art may understand that all or some of the modules, units, components and procedures of the foregoing embodiments may be implemented by a computer program instructing relevant hardware. The program may be stored in a non-volatile computer readable storage medium. When the program is executed, the program may control the hardware to execute the procedures of the embodiments of each foregoing method. Any usage of a memory, storage, a database or other media in each embodiment of this application may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. For description, rather than for limitation, RAM may be in various forms, for example, a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a directly memory bus dynamic RAM (DRDRAM), and a memory bus dynamic RAM (RDRAM).

Each technical feature in the foregoing embodiments may be combined randomly. For simplified description, not all possible combinations of each technical feature in the foregoing embodiments are described. However, the combinations of the technical features shall be considered to fall within the scope of the specification as long as the combinations are not contradictory. The foregoing embodiments only describe several implementations of this application, and their description is specific and detailed, but cannot therefore be construed as a limitation to the patent scope of the present disclosure. It should be noted that a person of ordinary skill in the art may further make variations and improvements without departing from the conception of this application, and these all fall within the protection scope of this application. Therefore, the patent protection scope of this application should be subject to the appended claims.

What is claimed is:

1. A keyword extraction method, performed by at least one processor, comprising:
   obtaining, by the at least one processor, to-be-determined words of to-be-processed text;
   determining, by the at least one processor, preceding words respectively corresponding to the to-be-determined words, the preceding words being words appearing in the to-be-processed text and preceding the to-be-determined words;
   determining, by the at least one processor, word sequences of the to-be-determined words according to orders in which the to-be-determined words and the preceding words respectively corresponding to the to-be-determined words appear in the to-be-processed text;
   inputting, by the at least one processor, the word sequences of the to-be-determined words respectively into a trained cyclic neural network model;
   obtaining, by the at least one processor, from the trained cyclic neural network model, a probability that each of the to-be-determined words is a keyword of the to-be-processed text; and
   determining, by the at least one processor, keywords of the to-be-processed text according to the probability that each of the to-be-determined words is a keyword of the to-be-processed text and a preset threshold.

2. The keyword extraction method according to claim 1, further comprising receiving, by the at least one processor, the to-be-processed text from an external device.

3. The keyword extraction method according to claim 2, further comprising transmitting, by the at least one processor, the keywords of the to-be-processed text that are determined as keywords to the external device.

4. The keyword extraction method according to claim 1, wherein the obtaining to-be-determined words of to-be-processed text comprises:
   performing, by the at least one processor, word segmentation on the to-be-processed text, to obtain words in the to-be-processed text; and
   identifying, by the at least one processor, stop words in the to-be-processed text and determining words other than the stop words in the to-be-processed text as the to-be-determined words.

5. The keyword extraction method according to claim 1, wherein the determining the word sequences of the to-be-determined words according to orders in which the to-be-determined words and the preceding words respectively corresponding to the to-be-determined words appear in the to-be-processed text comprises:
   obtaining, by the at least one processor, word vectors of the preceding words respectively corresponding to the to-be-determined words and word vectors of the to-be-determined words; and
   determining, by the at least one processor and according to the orders in which the preceding words respectively corresponding to the to-be-determined words and the to-be-determined words appear in the to-be-processed text, the word sequences of the to-be-determined words by using the word vectors of the preceding words respectively corresponding to the to-be-determined words and the word vectors of the to-be-determined words, the word sequences being word vector sequences.

6. The keyword extraction method according to claim 1, further comprising, before the inputting the word sequences of the to-be-determined words respectively into the trained cyclic neural network model:
   obtaining, by the at least one processor, a training sample; and
   inputting, by the at least one processor, the training sample to a cyclic neural network model to train the cyclic neural network model,
   wherein the training sample comprises an element pair, and the element pair comprises a training word corresponding to training text and a probability that the training word is a keyword of the training text.

7. The keyword extraction method according to claim 1, wherein the trained cyclic neural network model is a Long Short-Term Memory (LSTM) model.

8. A computer device, comprising:
   at least one memory configured to store computer program code;
   at least one processor configured to access the at least one memory and operate as instructed by the computer program code, the computer program code including:
   obtaining code configured to cause the at least one processor to obtain to-be-determined words of to-be-processed text;
   determining code configured to cause the at least one processor to determine preceding words respectively corresponding to the to-be-determined words, the preceding words being words appearing in the to-be-processed text and preceding the to-be-determined words;
   determining word sequences code configured to cause the at least one processor to determine word sequences of the to-be-determined words according to orders in which the to-be-determined words and the preceding words respectively corresponding to the to-be-determined words appear in the to-be-processed text;
   inputting code configured to cause the at least one processor to input the word sequences of the to-be-determined words respectively into a trained cyclic neural network model;
   probability obtaining code configured to cause the at least one processor to obtain, from the trained cyclic neural network model, a probability that each of the to-be-determined words is a key word of the to-be-processed text; and
   determining keywords code configured to cause the at least one processor to determine keywords of the to-be-processed text according to the probability that each of the to-be-determined words is a keyword of the to-be-processed text and a preset threshold.

9. The computer device according to claim 8, further comprising a communication interface,
   wherein the at least one processor receives the to-be-processed text from an external device via the communication interface.

10. The computer device according to claim 9, wherein the at least one processor transmits the keywords of the to-be-processed text that are determined as keywords to the external device.

11. The computer device according to claim 8, wherein the obtaining to-be-determined words of to-be-processed text comprises:
    performing word segmentation on the to-be-processed text, to obtain words in the to-be-processed text; and identifying stop words in the to-be-processed text and determining words other than the stop words in the to-be-processed text as the to-be-determined words.

12. The computer device according to claim 8, wherein the determining the word sequences of the to-be-determined words according to orders in which the to-be-determined words and the preceding words respectively corresponding to the to-be-determined words appear in the to-be-processed text comprises:
obtaining word vectors of the preceding words respectively corresponding to the to-be-determined words and word vectors of the to-be-determined words; and
determining, according to the orders in which the preceding words respectively corresponding to the to-be-determined words and the to-be-determined words appear in the to-be-processed text, the word sequences of the to-be-determined words by using the word vectors of the preceding words respectively corresponding to the to-be-determined words and the word vectors of the to-be-determined words, the word sequences being word vector sequences.

13. The computer device according to claim 8, further comprising code configured to cause the at least one processor to, before the inputting the word sequences of the to-be-determined words respectively into the trained cyclic neural network model:
obtain a training sample; and
input the training sample to a cyclic neural network model to train the cyclic neural network model,
wherein the training sample comprises an element pair, and the element pair comprises a training word corresponding to training text and a probability that the training word is a keyword of the training text.

14. The computer device according to claim 8, wherein the trained cyclic neural network model is a Long Short-Term Memory (LSTM) model.

15. One or more non-transitory storage mediums storing computer readable instructions, the computer readable instructions, when executed by one or more processors, causing the one or more processors to:
obtain to-be-determined words of to-be-processed text;
determine preceding words respectively corresponding to the to-be-determined words, the preceding words being words appearing in the to-be-processed text and preceding the to-be-determined words;
determine word sequences of the to-be-determined words according to orders in which the to-be-determined words and the preceding words respectively corresponding to the to-be-determined words appear in the to-be-processed text;
input the word sequences of the to-be-determined words respectively into a trained cyclic neural network model;
obtain, from the trained cyclic neural network model, a probability that each of the to-be-determined words is a key word of the to-be-processed text; and
determine keywords of the to-be-processed text according to the probability that each of the to-be-determined words is a keyword of the to-be-processed text and a preset threshold.

16. The one or more non-transitory storage mediums according to claim 15, wherein the computer readable instructions further cause the one or more processors to:
receive the to-be-processed text from an external device; and
transmit the keywords of the to-be-processed text that are determined as keywords to the external device.

17. The one or more non-transitory storage mediums according to claim 15, wherein the obtaining to-be-determined words of to-be-processed text comprises:
performing word segmentation on the to-be-processed text, to obtain words in the to-be-processed text; and
identifying stop words in the to-be-processed text and determining words other than the stop words in the to-be-processed text as the to-be-determined words.

18. The one or more non-transitory storage mediums according to claim 15, wherein the determining the word sequences of the to-be-determined words according to orders in which the to-be-determined words and the preceding words respectively corresponding to the to-be-determined words appear in the to-be-processed text comprises:
obtaining word vectors of the preceding words respectively corresponding to the to-be-determined words and word vectors of the to-be-determined words; and
determining, according to the orders in which the preceding words respectively corresponding to the to-be-determined words and the to-be-determined words appear in the to-be-processed text, the word sequences of the to-be-determined words by using the word vectors of the preceding words respectively corresponding to the to-be-determined words and the word vectors of the to-be-determined words, the word sequences being word vector sequences.

19. The one or more non-transitory storage mediums according to claim 15, wherein the computer readable instructions further cause the one or more processors to, before the inputting the word sequences of the to-be-determined words respectively into a cyclic neural network model:
obtain a training sample; and
input the training sample to a cyclic neural network model to train the cyclic neural network model,
wherein the training sample comprises an element pair, and the element pair comprising a training word corresponding to training text and a probability that the training word is a keyword of the training text.

20. The one or more non-transitory storage mediums according to claim 15, wherein the trained cyclic neural network model is a Long Short-Term Memory (LSTM) model.

* * * * *